US007867641B2

(12) United States Patent
Wu et al.

(10) Patent No.: US 7,867,641 B2
(45) Date of Patent: Jan. 11, 2011

(54) SOLAR ENERGY POWER SUPPLY SYSTEM

(76) Inventors: I-Long Wu, 2F., No. 85-1, Ninghan St., Situn District, Taichung City (TW); Chia-Tien Wu, 2F., No. 85-1, Ninghan St., Situn District, Taichung City (TW); Chia-Yun Wu, 2F., No. 85-1, Ninghan St., Situn District, Taichung City (TW)

( * ) Notice: Subject to any disclaimer, the term of this patent is extended or adjusted under 35 U.S.C. 154(b) by 949 days.

(21) Appl. No.: 11/652,065

(22) Filed: Jan. 11, 2007

(65) Prior Publication Data
US 2007/0166573 A1    Jul. 19, 2007

(30) Foreign Application Priority Data
Jan. 17, 2006    (TW)    ............... 95101714 A

(51) Int. Cl.
H01M 8/04    (2006.01)
H01M 16/00    (2006.01)
H01L 31/00    (2006.01)

(52) U.S. Cl. ............... 429/9; 136/252; 429/26; 429/22

(58) Field of Classification Search ............ 429/9, 429/22, 26; 136/252
See application file for complete search history.

(56) References Cited

U.S. PATENT DOCUMENTS 3,070,703 A * 12/1962 Podolny ............... 290/2
3,444,070 A * 5/1969 Williams ............... 204/224 M (Continued)

FOREIGN PATENT DOCUMENTS

JP    5864441    *    4/1983

(Continued)

OTHER PUBLICATIONS

Dictionary.com, "battery," in Dictionary.com Unabridged. Source location: Random House, Inc. http://dictionary.reference.com/browse/battery. Available: http://dictionary.reference.com. Accessed: Mar. 3, 2010.*

(Continued)

*Primary Examiner*—Ula C Ruddock
*Assistant Examiner*—Tamir Ayad
(74) *Attorney, Agent, or Firm*—Muncy, Geissler, Olds & Lowe, PLLC

(57)    ABSTRACT

A solar energy power supply system includes a solar battery, an electrolyte supply device, an electrolyte recycling device, a hydrogen recycling device, a fuel cell, a heating device and a power management device. Electric power generation is accomplished by first activating the electrolyte supply device to inject electrolyte into the solar battery. The electrolyte is a compound of water and a photo catalyst. The solar battery receives light or heat to generate electric power. Water vapor and hydrogen are generated and recycled through the electrolyte recycling device and the hydrogen recycling device. When the light or heat is not available the recycled hydrogen gas is delivered to the fuel cell to continuously generate the electric power or the heating device provides heat to the solar battery to continuously generate electric power. Electric current generated by the solar battery and fuel cell is controlled by the power management device to comply with electric power specification for final usage.

17 Claims, 6 Drawing Sheets

U.S. PATENT DOCUMENTS

| | | | | |
|---|---|---|---|---|
| 3,769,088 A | * | 10/1973 | Seiger et al. | 429/58 |
| 4,800,138 A | * | 1/1989 | Romanowski et al. | 429/19 |
| 4,830,678 A | * | 5/1989 | Todorof et al. | 136/259 |
| 6,096,969 A | * | 8/2000 | Fujita et al. | 136/259 |
| 6,127,054 A | * | 10/2000 | Ando et al. | 429/11 |
| 6,194,099 B1 | * | 2/2001 | Gernov et al. | 429/213 |
| 2003/0000213 A1 | * | 1/2003 | Christensen et al. | 60/670 |
| 2003/0059656 A1 | * | 3/2003 | Horiguchi et al. | 429/17 |
| 2003/0090233 A1 | * | 5/2003 | Browe | 320/101 |
| 2003/0203258 A1 | * | 10/2003 | Yang et al. | 429/25 |
| 2004/0149962 A1 | * | 8/2004 | Andriessen | 252/500 |
| 2005/0227135 A1 | * | 10/2005 | Chalkova et al. | 429/33 |

FOREIGN PATENT DOCUMENTS

| | | | |
|---|---|---|---|
| JP | 2002299675 A | * | 10/2002 |

OTHER PUBLICATIONS

Yazawa, Kiyoshi, JP 58-64441, English abstract.*
Ito, Akinori, JP 2002-299675 A, English abstract.*

* cited by examiner

SOLAR ENERGY POWER SUPPLY SYSTEM

FIELD OF THE INVENTION

The present invention relates to a solar energy power supply system and particularly to a power supply system that utilizes the heat of solar energy to automatically supply electrolyte so that a solar battery can generate electric power by light or heat. The system has a hydrogen recycling device which provides recycled hydrogen to a fuel cell to continuously generate the electric power when light and heat are not available, or provides heat to the solar battery by a heating device to continuously generate the electric power.

BACKGROUND OF THE INVENTION

The conventional solar energy power supply system generally includes a solar battery that contains a solar module formed by a plurality of solar cells (silicon chips at a thickness of 0.3 mm) on a glass panel. The quantity of the solar cells coupled in series and parallel determines the voltage and current values of the solar module. In the event that any one of the series or parallel connection point is defective, total performance will be seriously affected. During fabrication process the delicate chips are easily damaged. Moreover, the solar module almost is not functional when sun light is not available. It also stops functioning when the temperature is higher than 90-100. The crystallized solar cells must have their light receiving surface laid on a same plane. In the event that a portion thereof is shaded or masked, power output declines or stops. Furthermore, a vast size of solar cells is needed for the solar module to generate high electric power. It has only one light receiving surface which must face the direction of sun constantly to get a desired efficiency. Power supply at night relies on the power stored in a storage battery which charged during day time by the solar battery. The amount of stored power is greatly affected by weather conditions.

SUMMARY OF THE INVENTION

The primary object of the present invention is to overcome the disadvantages of the conventional solar energy power supply system by providing a novel solar energy power supply system that is a full time power supply system to improve practicality.

The solar energy power supply system of the present invention includes a solar battery which is an improved version of the one previously proposed by Applicant (U.K patent No. GB2418056). A photo catalyst is added to the electrolyte and a transparent and heat-resistant insulation shell is provided to encase a positive electrode substrate, a negative electrode substrate and the electrolyte. It can receive light or heat to enhance electric power generation.

According to the solar energy power supply system of the present invention, the solar battery can generate electric power day and night as long as light or heat is available. It is simply constructed and sturdy, and is not affected by partial shading. It has multiple light receiving surfaces and its electric power generation is further enhanced at high temperature of 90-100 or above. It overcomes the drawbacks of the conventional solar module. It also coupled with an electrolyte supply device, an electrolyte recycling device, a hydrogen recycling device, a fuel cell, a heating device and a power management device to become a more comprehensive solar energy power supply system.

The foregoing, as well as additional objects, features and advantages of the present invention will be more readily apparent from the following detailed description, which proceeds with reference to the accompanying drawings.

DETAILED DESCRIPTION OF THE PREFERRED EMBODIMENTS

Figure 1:
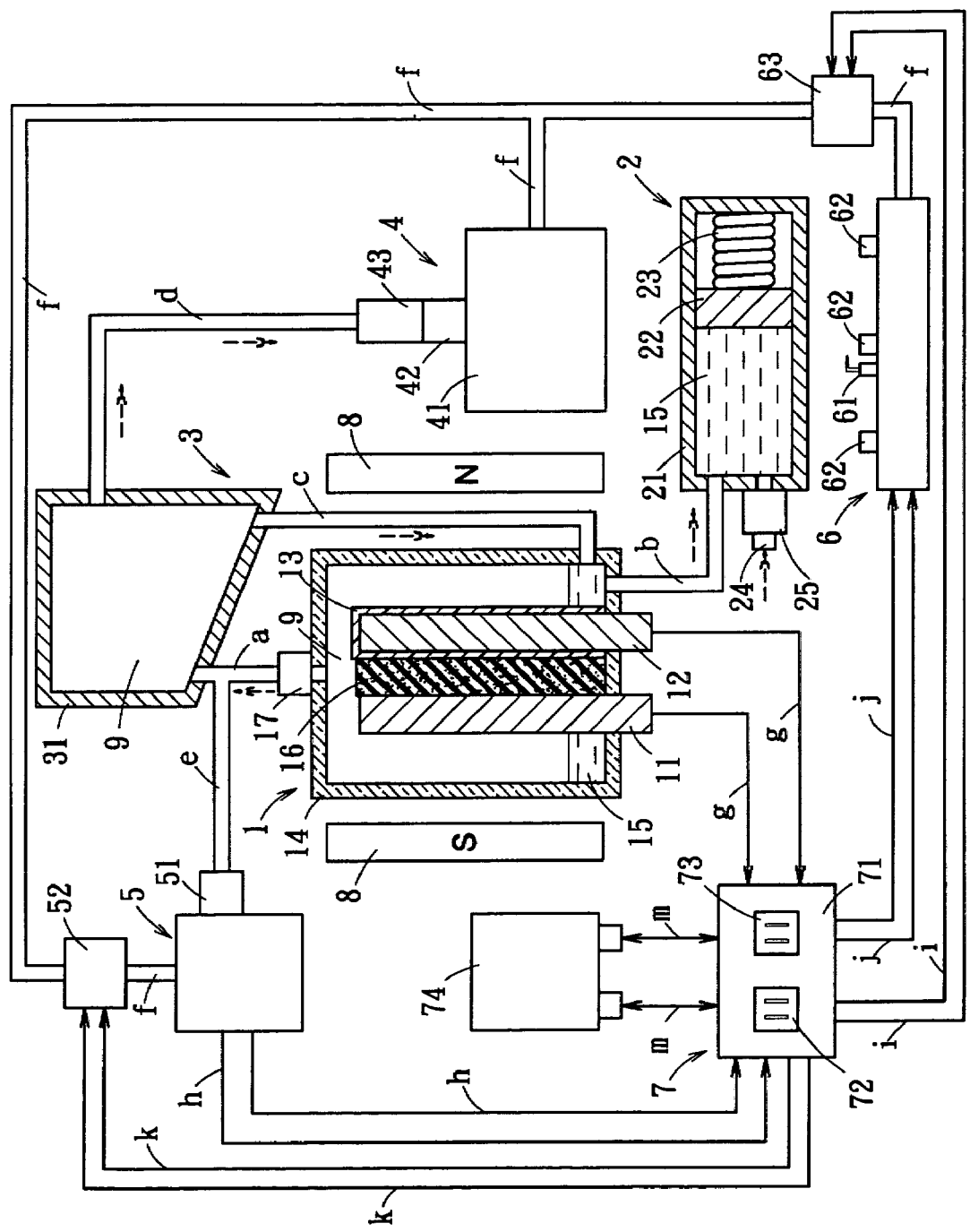
FIG. 1 is a schematic view of the solar energy power supply system of the present invention to generate electric power in a condition of no light or heat.

Referring to FIG. 1, the solar energy power supply system according to the present invention includes a solar battery 1, an electrolyte supply device 2, an electrolyte recycling device 3, a hydrogen recycling device 4, a fuel cell 5, a heating device 6 and a power management device 7.

The solar battery 1 includes a positive electrode substrate 11 which is a low potential conductor with oxidation-resistant or a low potential conductor that is oxidation-resistant but can activate or ionize water, a negative electrode substrate 12 which is a high potential conductor, a film 13 which is a porous or osmotic layer covering the negative electrode substrate 12, electrolyte 15 which is a compound consisting of water or weak acid and a photo catalyst and a non-photo catalyst, an insulation shell 14 which is a container made from a transparent and heat-resistant material to receive light and heat from multiple sides to cover the positive electrode substrate 11, negative electrode substrate 12 and electrolyte 15, and has at least one connection port, a water absorbent 16 to adsorb the electrolyte 15, a safety valve 17 and a permanent magnet 8. When the pressure of hydrogen gas and water vapor 9 inside the insulation shell 14 is higher than a preset pressure, the safety valve 17 automatically opens to release the pressure to the atmosphere. The permanent magnet 8 generates a magnetic field to activate or ionize water.

The solar battery 1 generates ions from the water or weak acid by the photo catalyst and non-photo catalyst that serve as electricity transfer media in the battery and become the source of power supply of the battery through the potential difference between the positive electrode substrate 11 and the negative electrode substrate 12. During generation of the electric power the water vapor 9 is produced. A portion of the water may also be electrolyzed to produce hydrogen and oxygen gases.

The photo catalyst can activate or ionize water in the electrolyte 15 when light exists, and can enhance activation or ionization of water when heat is applied. It includes at least $TiO_2$, $ZnO$, $SnO_2$, $ZrO_2$, $CdS$ or $ZnS$ formed at a nanometer scale. The non-photo catalyst also can activate or ionize water in the electrolyte 15 when light or heat is not available. It includes at least infrared nano ceramics, nano anion material, nano carbon, nano carbon tubes, nano silver ions, nano gold ions, active carbon, an acid root or the like. The positive electrode substrate 11 may be a conductor capable of emitting electromagnetic waves or a compound formed by mixing the material of the non-photo catalyst (except acid root) with conductor particles or fibers according to a suitable ratio. In the event that a water absorbing conductor (such as active carbon or fibers thereof) capable of activating or ionizing water is used as the positive electrode substrate 11, it can replace the absorbent 16.

The voltage value and the potential difference between the positive electrode substrate 11 and the negative electrode substrate 12 is direct proportional, but is inverse proportional against the distance between the two. Hence the positive electrode substrate 11 is preferably made from a conductor of a low potential that is oxidation-resistant. The negative electrode substrate 12 is preferably made from a conductor of a high potential (such as aluminum, zinc, alloys of aluminum and zinc, alloys of aluminum and zinc and lithium, alloys of aluminum and zinc and magnesium, alloys of aluminum and zinc and lithium and magnesium, alloys of aluminum and lithium, alloys of aluminum and magnesium, alloys of aluminum and lithium and magnesium, alloys of zinc and lithium, alloys of zinc and magnesium, or alloys of zinc and lithium and magnesium). The film 13 is a polymer membrane or proton exchange membrane or a conversion coating, or the like.

The electrolyte supply device 2 includes a cylinder 21, a piston 22, an actuator 23, an injection orifice 24 and a first check valve 25. The actuator 23 is a shape memory alloy or bimetal and has an expandable shape under heat. The electrolyte 15 is injected through the injection orifice 24. The actuator 23 expands under heat to push the piston 22 to deliver the electrolyte 15 from the cylinder 21 to the insulation shell 14 through a tubing b (which connects the electrolyte supply device 2 to the solar battery 1) to replenish the electrolyte 15. On the other hand, when the heat is absent, the actuator 23 retracts, and the piston 22 withdraws the electrolyte 15 from the insulation shell 14 to the cylinder 21 through the tubing b.

The electrolyte recycling device 3 includes a cooler 31 and a first recycling tubing c.

The hydrogen recycling device 4 includes a container 41, a second check valve 42 and a filter 43. The filter 43 filters out impurities from the hydrogen gas so that only hydrogen gas is allowed to pass through.

The fuel cell 5 has a third check valve 51, a first solenoid valve 52 and a second recycling tubing e.

The heating device 6 includes an automatic igniter 61, a gas nozzle 62 and a second solenoid valve 63.

The power management device 7 includes a controller 71, a DC socket 72, an AC socket 73 and a storage battery 74. The controller 71 aims to charge the storage battery 74 with electric current generated by the solar battery 1 and fuel cell 5 through a circuit m. The storage battery 74 also delivers the stored electric power through the circuit m to the controller 71 to supply AC and DC power to the AC socket 73 and DC socket 72, and controls power ON/OFF of the first solenoid valve 52, automatic igniter 61 and second solenoid valve 63 through circuits k, j and i. The first, second, and third check valves 25, 42 and 51 force fluid to flow according to a set direction (such as the ones indicated by the arrows shown in FIG. 4) without flowing backwards.

Refer to FIG. 1 for the electric power generating process of the solar energy power supply system of the present invention in a condition of no light or heat.

The actuator 23 retracts, the absorbent 16 adsorbs the electrolyte 15, the permanent magnet 8 and the non-photo catalyst in the electrolyte 15 activate or ionize water in the electrolyte 15 to become ions. A potential difference occurs between the positive electrode substrate 11 and negative electrode substrate 12, electric current is sent to the controller 71 through a circuit g, and to charge the storage battery 74 through the circuit m. Meanwhile hydrogen gas and water vapor 9 are generated and sent to the cooler 31 through a tubing a (which connects the electrolyte recycling device 3 to the solar battery 1). The water vapor is cooled and condensed to become liquid water to be sent to the insulation shell 14 through the first recycling tubing c. The hydrogen gas is sent to the container 41 through a tubing d (which connects the hydrogen recycling device 4 to the electrolyte recycling device 3).

Figure 2:
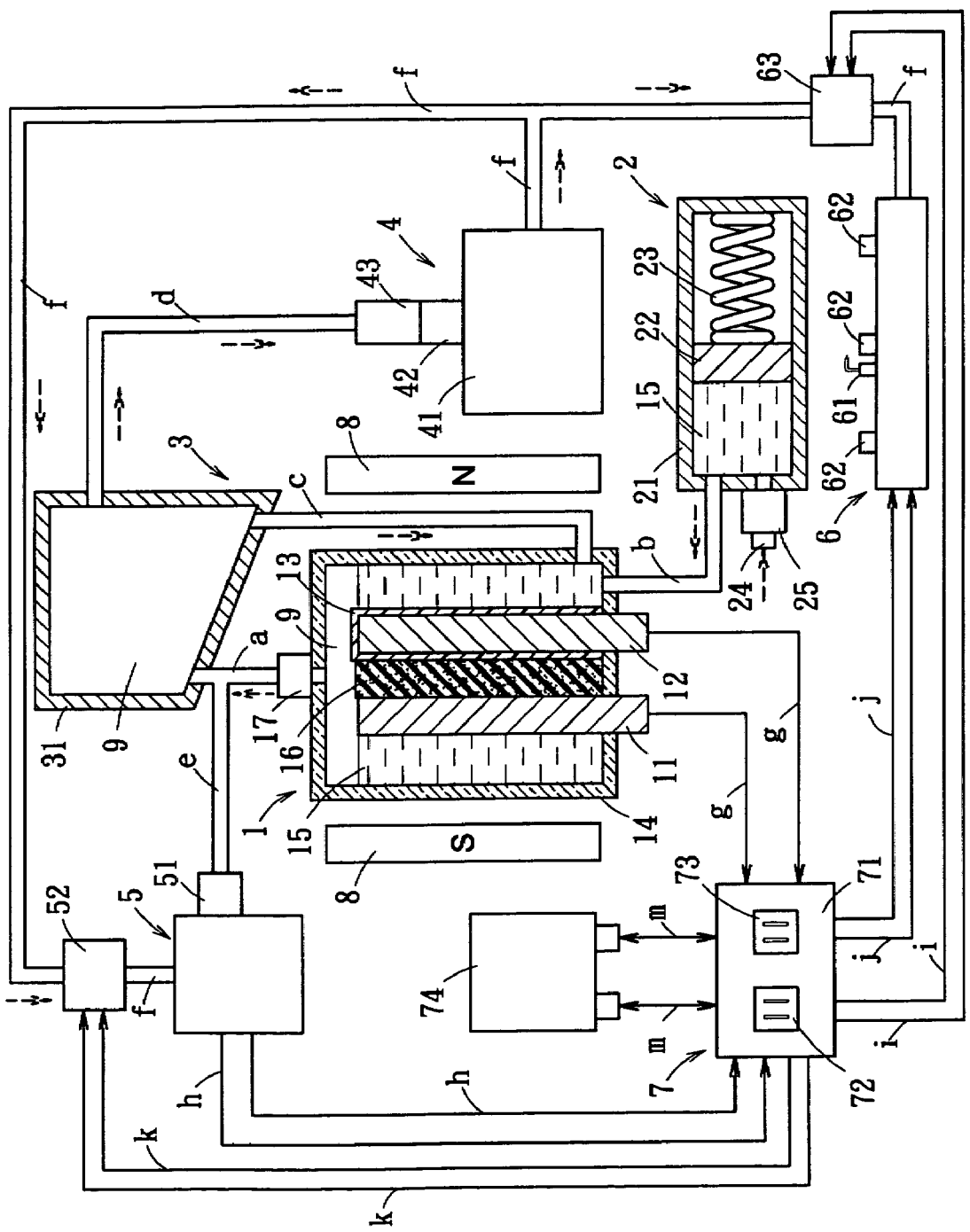
FIG. 2 is a schematic view of the solar energy power supply system of the present invention to generate electric power in a condition of receiving sunlight or heat.

Refer to FIG. 2 for the electric power generating process of the solar energy power supply system of the present invention in a condition of receiving sunlight or heat.

The actuator 23 expands under heat to push the piston 22, and the electrolyte 15 is delivered to the insulation shell 14 (i.e. the solar battery 1) from the cylinder 21 through the tubing b. The permanent magnet 8 and the photo catalyst and non-photo catalyst in the electrolyte 15 quickly activate or ionize water in the electrolyte 15 to become ions. A potential difference occurs between the positive electrode substrate 11 and negative electrode substrate 12, electric current is sent to the controller 71 through the circuit g, and to charge the storage battery 74 through the circuit m. Meanwhile hydrogen gas and water vapor 9 are generated and sent to the cooler 31 through the tubing a. The water vapor is cooled and condensed to become liquid water to be sent to the insulation shell 14 through the first recycling tubing c. The electrolyte 15 is expanded under heat and overflows to the cooler 31 through the tubing a, and is sent to the insulation shell 14 though the first recycling tubing c. The hydrogen gas is sent to the container 41 through the tubing d.

Figure 3:
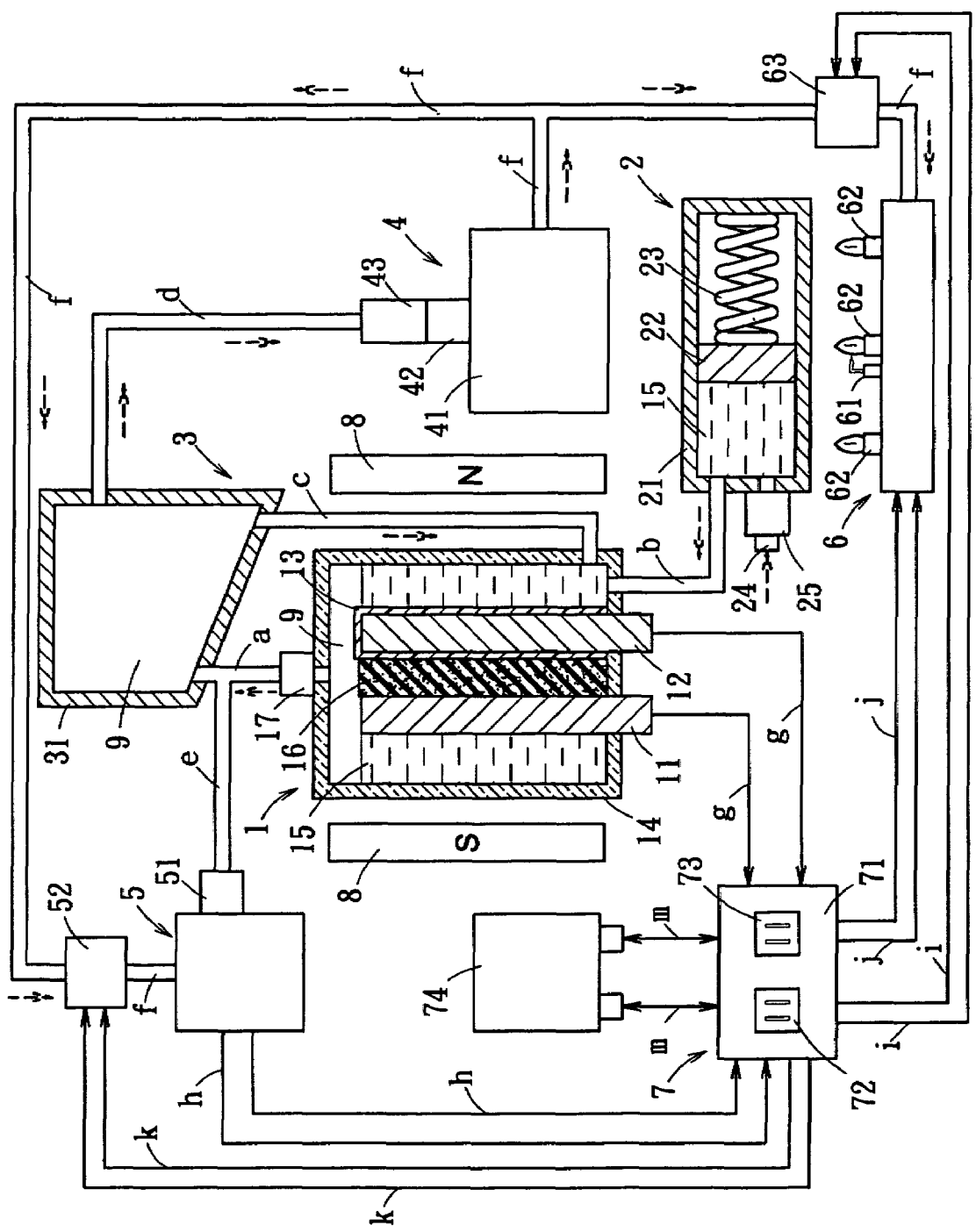
FIG. 3 is a schematic view of the solar energy power supply system of the present invention to generate electric power through heat produced by the stored hydrogen gas.

Refer to FIG. 3 for the electric power generating process of the solar energy power supply system of the present invention through heat produced by the stored hydrogen gas in the condition of no light or heat.

The storage battery 74 delivers the stored electric power to the controller 71 through the circuit m. The controller 71 activates the second solenoid valve 63 through the circuit i. The hydrogen gas is sent from the container 41 to the gas nozzle 62 through a tubing f (which connects the hydrogen recycling device 4 to the heating device 6). The controller 71 activates the automatic igniter 61 through the circuit j to burn the hydrogen gas to provide heat for the solar battery 1 and electrolyte supply device 2. The actuator 23 expands under heat to push the piston 22, and the electrolyte 15 is sent to the insulation shell 14 from the cylinder 21 through the tubing b. The permanent magnet 8 and the photo catalyst and non-photo catalyst in the electrolyte 15 quickly activate or ionize water in the electrolyte 15 to become ions. A potential difference occurs between the positive electrode substrate 11 and negative electrode substrate 12, electric current is sent to the controller 71 through the circuit g. Meanwhile hydrogen gas and water vapor 9 are generated and sent to the cooler 31 through the tubing a. The water vapor is cooled and condensed to become liquid water to be sent to the insulation shell 14 through the first recycling tubing c. The electrolyte 15 is expanded under heat and overflows to the cooler 31 through the tubing a, and is delivered to the insulation shell 14 through the first recycling tubing c. The hydrogen gas is sent to the container 41 through the tubing d.

Figure 4:
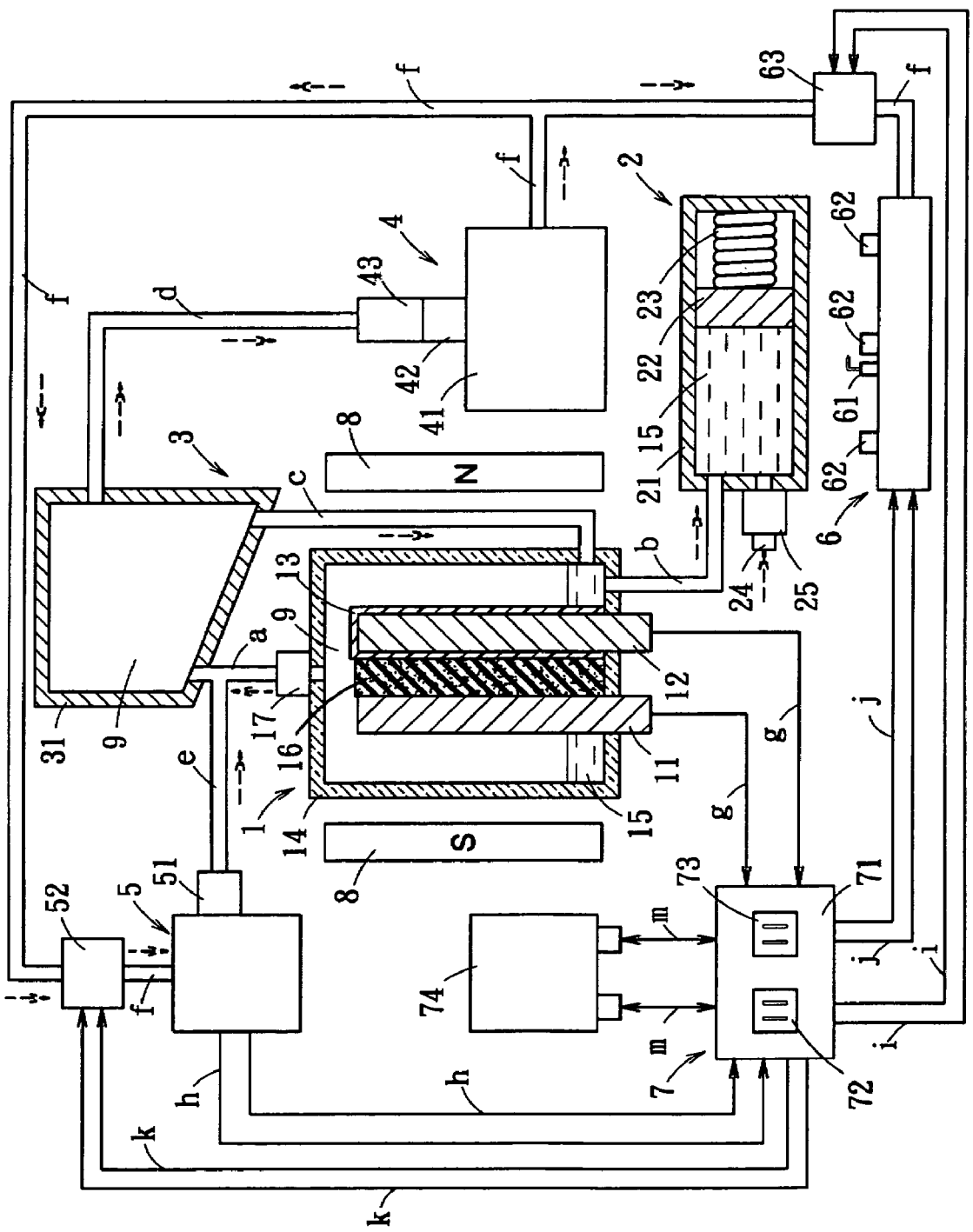
FIG. 4 is a schematic view of the solar energy power supply system of the present invention to generate electric power through a fuel cell by using the stored hydrogen gas.

Refer to FIG. 4 for the electric power generating process of the solar energy power supply system of the present invention through a fuel cell 5 by using stored hydrogen gas in the no light or heat condition.

The actuator 23 retracts, the storage battery 74 delivers the stored electric power to the controller 71 through the circuit m. The controller 71 activates the first solenoid valve 52 through the circuit k. The hydrogen gas is sent from the container 41 to the fuel cell 5 through the tubing f (which connects the fuel cell 5 to the hydrogen recycling device 4). The fuel cell 5 generates electric current which is delivered to the controller 71 through a circuit h. Water or water vapor being generated is sent to the cooler 31 through the second recycling tubing e. After cooling, water is sent to the insulation shell 14 through the first recycling tubing c.

Figure 5:
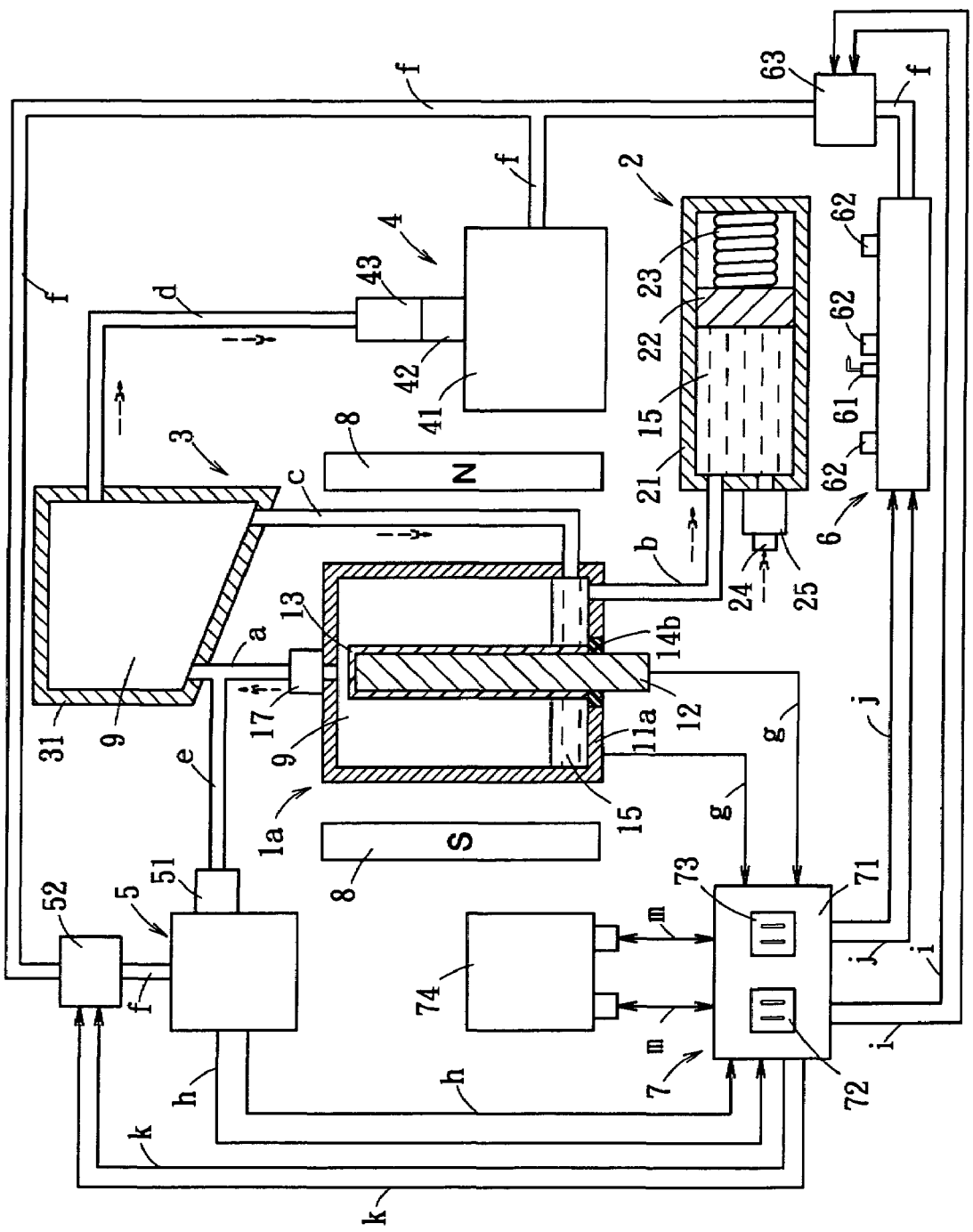
FIG. 5 is a schematic view of an embodiment of the solar battery of the present invention.

Refer to FIG. 5 for an embodiment of the solar battery of the present invention. In this embodiment the solar battery 1a differs from the solar battery 1 shown in FIG. 1 by having the positive electrode substrate 11a serving as the shell.

The solar battery 1a includes a positive electrode substrate 11a which is a low potential conductor with oxidation-resistant or a low potential conductor that is oxidation-resistant but can activate or ionize water, a negative electrode substrate 12 which is a high potential conductor, a film 13 which is a porous or osmotic layer covering the negative electrode substrate 12, a shell which is also the positive electrode substrate 11a to cover the negative electrode substrate 12 and electrolyte 15 and has at least one connection port, an insulation member 14b located on the connecting surface of the positive electrode substrate 11a and negative electrode substrate 12 to prevent short circuit, the electrolyte 15 which is a compound consisting of water or weak acid and a photo catalyst and a non-photo catalyst, a safety valve 17 which automatically opens when the pressure of hydrogen gas and water vapor 9 in the positive electrode substrate 11a is greater than a preset pressure to release the pressure in the atmosphere, and a permanent magnet 8 to generate a magnetic field to activate or ionize water.

Figure 6:
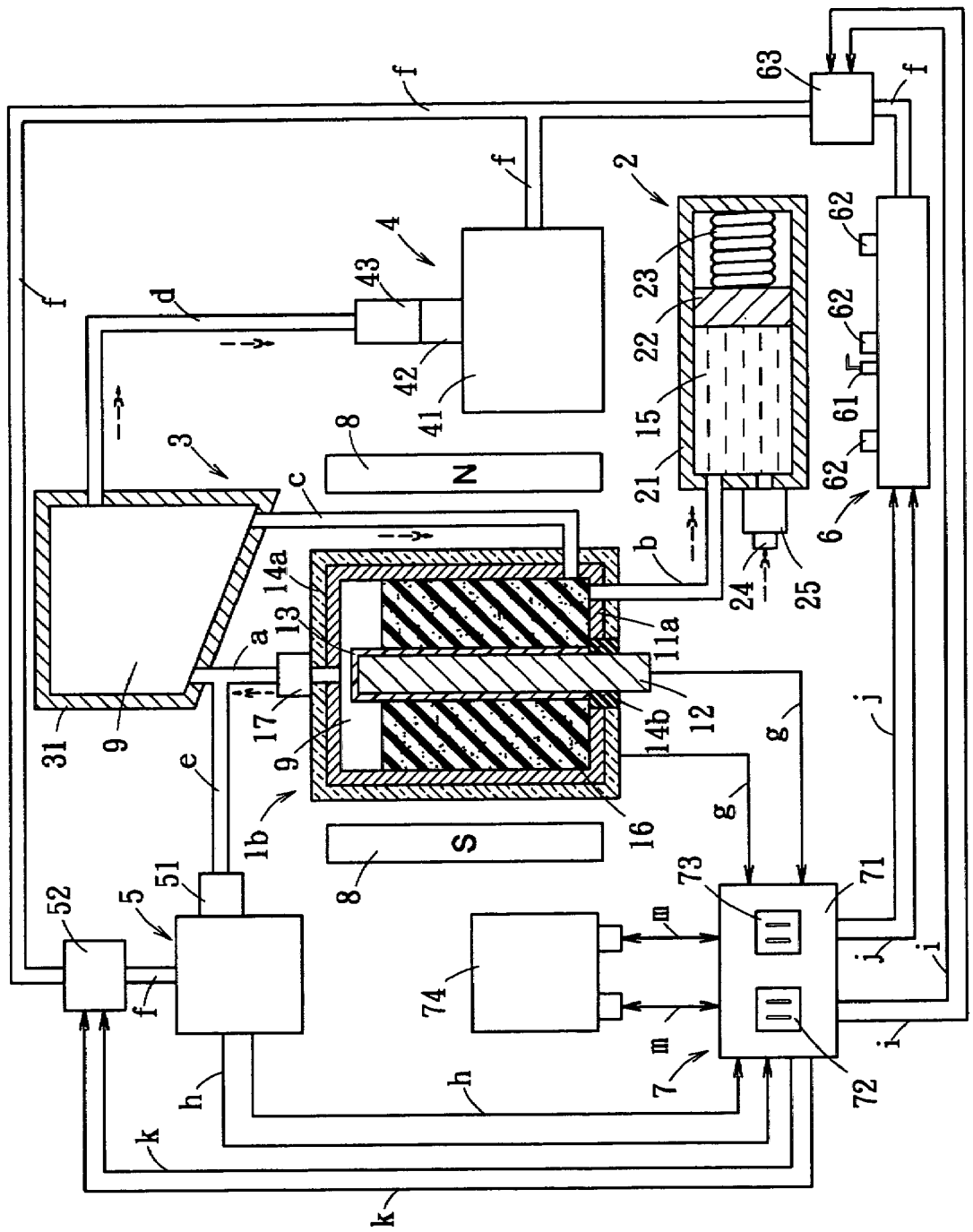
FIG. 6 is a schematic view of another embodiment of the solar battery of the present invention.

FIG. 6 shows another embodiment of the solar battery of the present invention. The solar battery 1b in this embodiment differs from the solar battery 1a depicted in FIG. 5 by adding an absorbent 16 between the positive electrode substrate 11a and the film 13 of the negative electrode substrate 12, and the positive electrode substrate 11a is covered by a conductive shell 14a to serve as the shell.

When the solar battery 1 receives light or heat electric power generation increases. However, the solar batteries 1a and 1b increase electric power generation only when heat is applied.

The film 13 in the embodiments set forth above further includes an additive (a nano scale photo catalyst or a nano scale non-photo catalyst) to enhance water activating or ionizing efficiency.

In short, the solar energy power supply system of the present invention can generate electric power whether light or heat is available or not. It is a full time power supply system. In practice it can be assembled to form various combinations according to different requirements of product sizes, costs, utilization or the like. The operation principle remains unchanged.

What is claimed is:

1. A solar energy power supply method, comprising the steps of:

providing a solar battery and an electrolyte supply device connected to the solar battery through a first tubing to provide an electrolyte to the solar battery, wherein the solar battery receives either light or heat to generate electric power and produce water vapor and hydrogen gas;

providing an electrolyte recycling device connected to the solar battery through a second tubing and a first recycling tubing, wherein the electrolyte recycling device includes a cooler which receives the water vapor from the solar battery through the second tubing, and the cooler cools the water vapor to become liquid water and sends the liquid water to the solar battery through the first recycling tubing so that the water vapor can be recycled and reused;

providing a hydrogen recycling device connected to the cooler through a third tubing which is connected with the second tubing, wherein the hydrogen recycling device includes a container, a second check valve and a filter, and the container stores the hydrogen gas produced by the solar battery through the second tubing, the hydrogen recycling device and the third tubing;

providing a fuel cell connected to the electrolyte recycling device through a second recycling tubing, which includes a third check valve, a first solenoid valve;

providing a heating device connected to the hydrogen recycling device and the fuel cell through a fourth tubing which includes an automatic igniter, a gas nozzle and a second solenoid valve, wherein the hydrogen gas stored in the hydrogen recycling device is sent into the gas nozzle through the second solenoid valve which is connected with the fourth tubing, and the automatic igniter burns the hydrogen gas coming from the gas nozzle to provide heat for the solar battery and the electrolyte supply device;

providing a power management device which includes a controller, a storage battery, a DC socket and an AC socket; directing with the controller charging of the storage battery with electric current generated by the solar battery and the fuel cell through a circuit, the storage battery delivering the stored electric power through the circuit to the controller to supply AC and DC power to the AC socket and the DC socket, the controller controlling power ON/OFF of the first and second solenoid valves and the automatic igniter through three different circuits; and wherein when the light or heat is not available the controller selectively delivering recycled hydrogen gas through the tubing to either the fuel cell or the heating device to produce heat to heat the solar battery to generate the electric power continuously, electric current generated by the solar battery and the fuel cell being controlled by the power management device to comply with electric power specification for final usage.

2. The solar energy power supply method of claim 1, wherein the solar battery includes at least:

a positive electrode substrate which is selectively a low potential conductor which is oxidation-resistant or a low potential conductor which is oxidation-resistant but activates or ionizes water;

a negative electrode substrate which is a high potential conductor;

a film which is porous and covers the negative electrode substrate;

an electrolyte which is a compound consisting of either water or a weak acid and a photo catalyst which activates or ionizes water upon receiving light or heat; and an insulation shell which is a container made from a transparent and heat-resistant material to receive light and heat from multiple sides and covers the positive electrode substrate, the negative electrode substrate and the electrolyte and has at least one connection port;

wherein either the water or the weak acid in the solar battery generate ions by the photo catalyst that serve as electricity transfer media in the battery, to generate a potential difference between the positive electrode substrate and the negative electrode substrate to become a source of power supply.

3. The solar energy power supply method of claim 1, wherein the solar battery includes at least:
a positive electrode substrate which is selectively a low potential conductor with oxidation-resistant or a low potential conductor which is oxidation-resistant but activates or ionizes water;
a negative electrode substrate which is a high potential conductor;
a film which is porous and covers the negative electrode substrate; and
an electrolyte which is a compound consisting of either water or a weak acid and a photo catalyst which activates or ionizes water upon receiving heat;
wherein the positive electrode substrate serves as a shell to cover the negative electrode substrate and the electrolyte and has at least one connection port, and the positive electrode substrate and the negative electrode substrate are interposed by a connecting surface which has an insulation member disposed thereon to prevent short circuit;
wherein either the water or the weak acid in the solar battery generate ions by the photo catalyst that serve as electricity transfer media in the battery, to generate a potential difference between the positive electrode substrate and the negative electrode substrate to become a source of power supply.

4. The solar energy power supply method of claim 2, wherein the positive electrode substrate is a compound formed by mixing particles and fibers of a conductor to a desired ratio which can emit electromagnetic waves with one material selected from the group consisting of at least infrared nano ceramics, nano anion material, nano carbon, nano carbon tubes, nano silver ions, nano gold ions and active carbon and a compound thereof.

5. The solar energy power supply method of claim 2, wherein the positive electrode substrate is made from either active carbon or active carbon fibers, the negative electrode substrate being selected from the group consisting of aluminum, zinc, alloys of aluminum and zinc, alloys of aluminum and zinc and lithium, alloys of aluminum and zinc and magnesium, alloys of aluminum and zinc and lithium and magnesium, alloys of aluminum and lithium, alloys of aluminum and magnesium, alloys of aluminum and lithium and magnesium, alloys of zinc and lithium, alloys of zinc and magnesium, or alloys of zinc and lithium and magnesium.

6. The solar energy power supply method of claim 2, wherein the film is an osmotic layer.

7. The solar energy power supply method of claim 2, wherein the film is a proton exchange membrane.

8. The solar energy power supply method of claim 2, wherein the photo catalyst is selected from the group consisting of at least $TiO_2$, $ZnO$, $SnO_2$, $ZrO_2$, $CdS$ and $ZnS$ that are formed at a nanometer scale.

9. The solar energy power supply method of claim 2, wherein the solar battery further includes a non-photo catalyst which activates or ionizes water in either the no light or heat condition.

10. The solar energy power supply method of claim 9, wherein the non-photo catalyst is selected from the group consisting of at least infrared nano ceramics, nano anion material, nano carbon, nano carbon tubes, nano silver ions, nano gold ions, active carbon and an acid root.

11. The solar energy power supply method of claim 2, wherein the solar battery further has a magnetic field to activate or ionize water.

12. The solar energy power supply method of claim 2, wherein the solar battery further has an absorbent located between the positive electrode substrate and the film.

13. The solar energy power supply method of claim 3, wherein the solar battery further has an absorbent located between the positive electrode substrate and the film.

14. The solar energy power supply method of claim 2, wherein the film is made from either polymers or a conversion coating.

15. The solar energy power supply method of claim 1, wherein the electrolyte supply device includes a cylinder, a piston, a actuator, an injection orifice and a first check valve; the actuator being selected from either a shape memory alloy or a bimetal and having an expandable shape under the heat; the actuator being activated by the heat to inject the electrolyte into the solar battery from the electrolyte supply device through the tubing.

16. The solar energy power supply method of claim 3, wherein the solar battery further includes a conductive shell to cover the positive electrode substrate.

17. The solar energy power supply method of claim 2, wherein the film further includes an additive being selected from the group consisting of a nano scale photo catalyst and a nano scale non-photo catalyst to enhance water activating or ionizing efficiency.

* * * * *